Oct. 29, 1935.  K. BACKLUND  2,019,169

STRAINER

Filed Feb. 17, 1934  3 Sheets-Sheet 1

INVENTOR
KNUTE BACKLUND
BY James C. Bradley
ATTORNEY

Oct. 29, 1935.   K. BACKLUND   2,019,169
STRAINER
Filed Feb. 17, 1934   3 Sheets-Sheet 2

INVENTOR
KNUTE BACKLUND
BY James C. Bradley
ATTORNEY

Oct. 29, 1935.　　　　K. BACKLUND　　　　2,019,169
STRAINER
Filed Feb. 17, 1934　　　3 Sheets-Sheet 3

INVENTOR
KNUTE BACKLUND
BY James C. Bradley
ATTORNEY

Patented Oct. 29, 1935

2,019,169

UNITED STATES PATENT OFFICE 2,019,169

STRAINER

Knute Backlund, Pittsburgh, Pa.

Application February 17, 1934, Serial No. 711,696

1 Claim. (Cl. 210—168)

Figure 1:
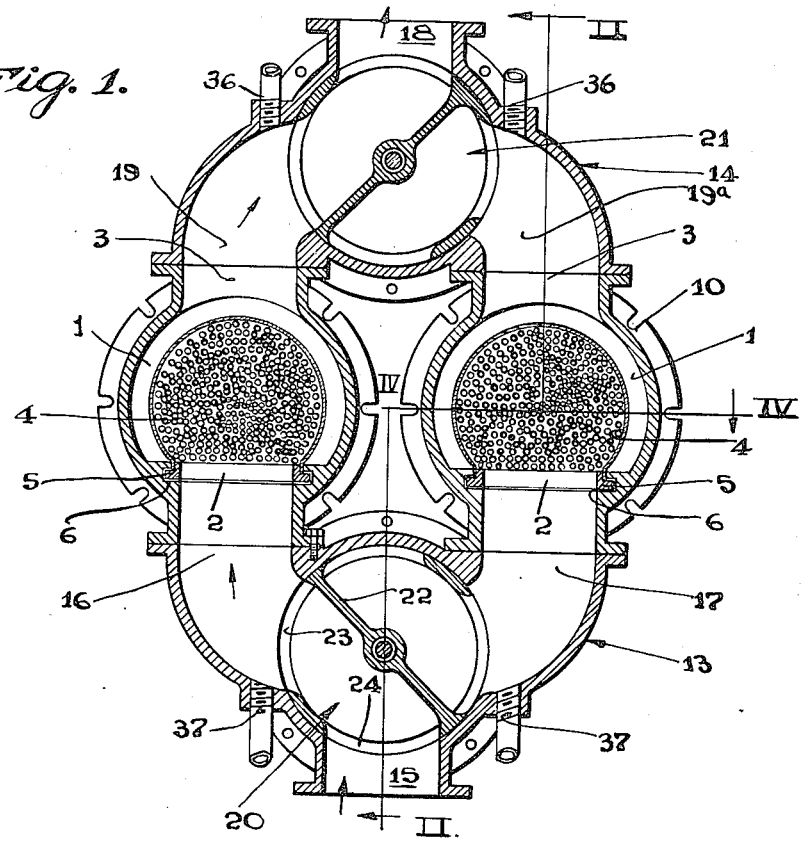
Figure 4:
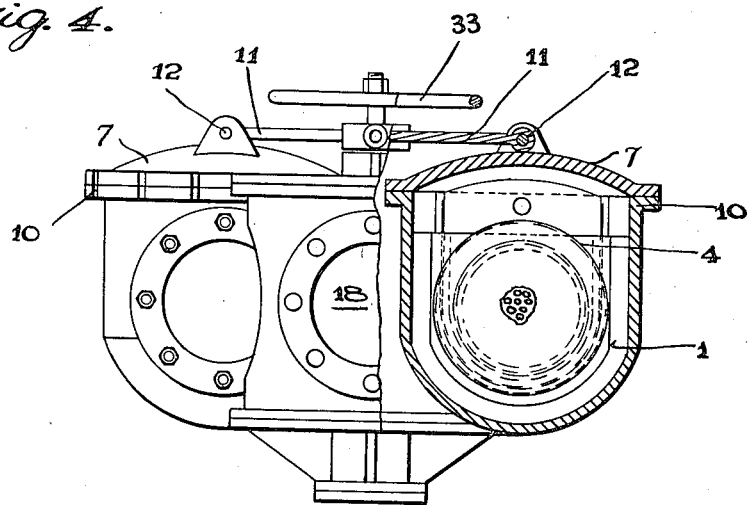
Figure 2:
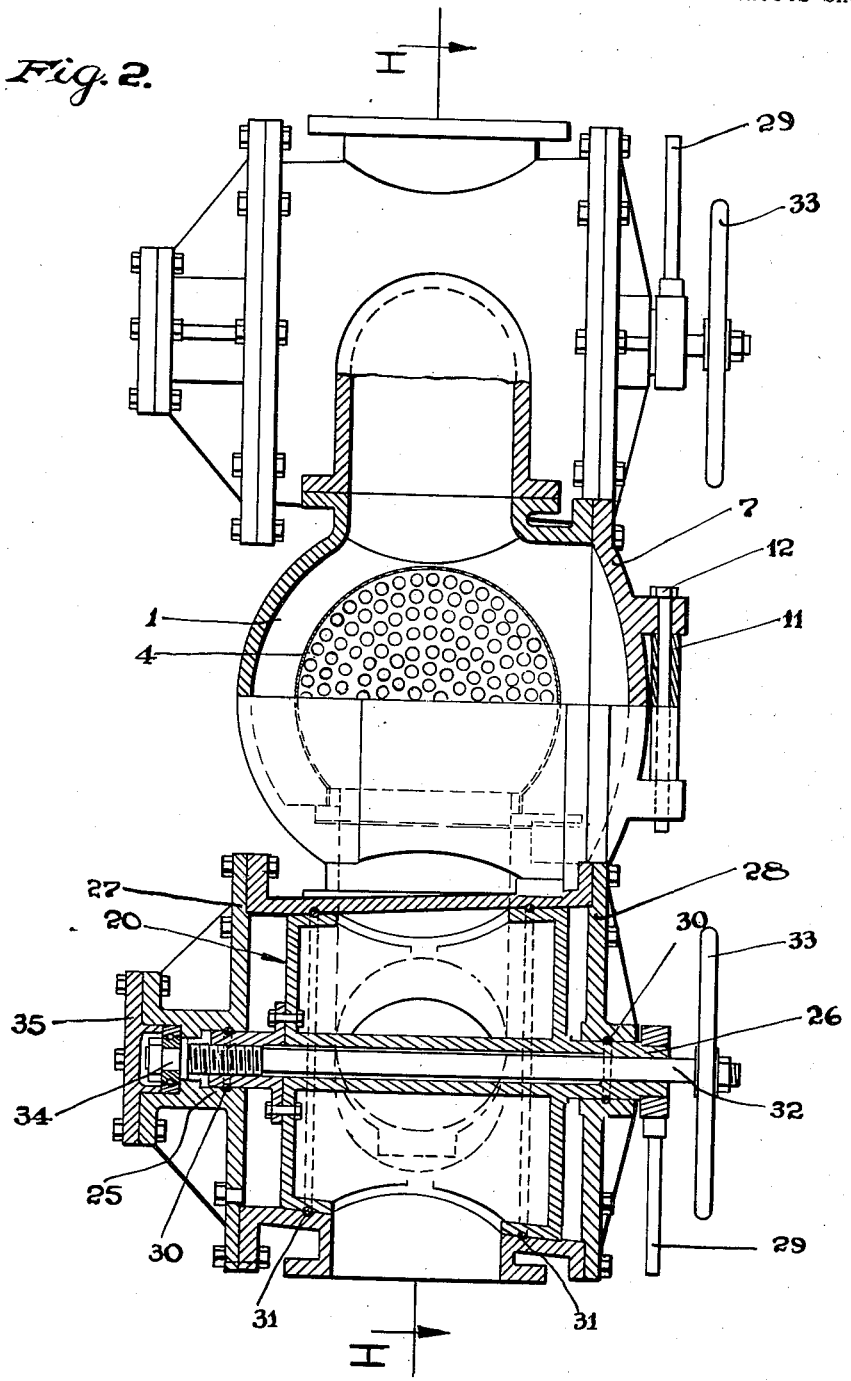
Figure 3:
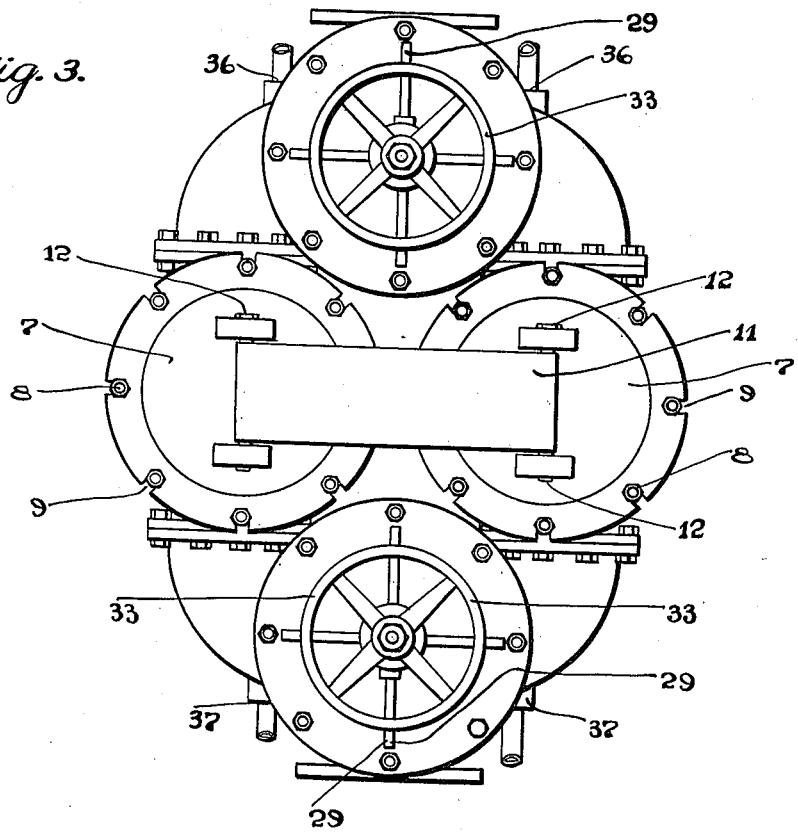
Figure 5:
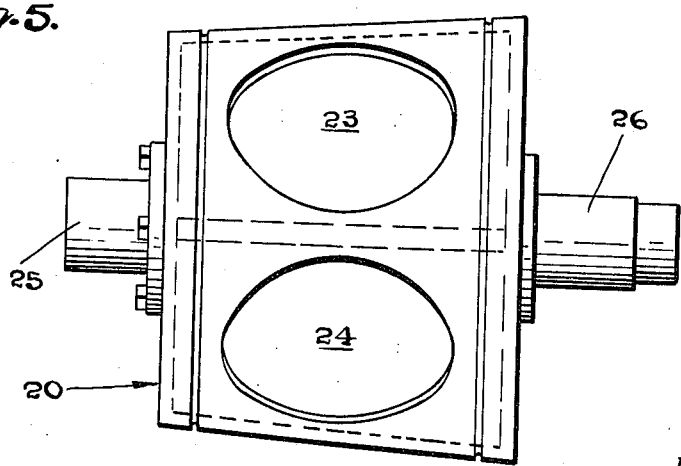

The invention relates to strainers to prevent solid particles in a liquid from a source of supply, such as a river, from entering a piping system, and particularly to strainers of the duplex type, although certain features of the invention are not limited to use in strainers of this particular type. A duplex strainer is constructed so that one side may be shut off and the strainer element therein removed for cleaning without interrupting the flow of liquid through the strainer element in the other side of the casing. The invention has for its principal objects, (1) the provision of a construction which will offer an unrestricted flow of liquid through the strainer without abrupt changes of direction or reduced areas of section tending to increase frictional resistance; (2) the provision of a strainer element or basket which has greater strength than the conical or cylindrical baskets heretofore employed and a greater straining area in proportion to the space required for the basket, thus permitting a more compact arrangement; (3) the provision of an improved construction whereby the strainer basket may be flushed and cleaned without opening up the strainer chamber to remove the basket; and (4) the provision of a device of simple construction permitting the ready replacement of any element which may be damaged; which avoids the use of flat surfaces, and has a high degree of strength; and in which the parts subject to injury by contact with the liquid handled, such as valve stems, screws, valve seats or other finished surfaces are removed from the path of the liquid, thus eliminating the cutting or wearing effect incident to such exposure. One embodiment of the invention is illustrated in the accompanying drawings, wherein:

Figure 1 is a vertical section through the construction. Fig. 2 is a section on the line II—II of Fig. 1. Fig. 3 is a side elevation. Fig. 4 is a partial plan view and partial section on the line IV—IV of Fig. 1. And Fig. 5 is a side elevation of one of the rotating, reversing valves.

The body of the strainer comprises the chambers 1, 1, each having an inlet opening 2, and an outlet opening 3. The chambers carry the straining baskets 4, 4 of sheet metal perforated with holes of suitable size and spacing. The lower sides of the baskets are open so that they register with the inlet openings 2 and the edges are secured to the annular ribs or flanges 5 mounted in the guideways 6. One end of each of the chambers 1, 1 is open (Figs. 2 and 4) and such ends are closed by the covers 7, 7 secured in position by the bolts 8 which extend through the slots 9 in the covers and through corresponding slots in the flanges 10 at the ends of the chambers. The two covers are connected by the hinge bar 11 secured at its ends to the pivot rods 12 mounted in lugs on the covers. When the covers are open, the flanges 5 carrying the baskets 4 can be moved along the guideways 6 and removed from their chambers. Because one of the covers 7 is always bolted in position, it serves as a support for the other cover when such other cover is unbolted and swung back upon the hinge bar.

The chambers 1, 1 are each flanged top and bottom and bolted to these flanges are the similar Y fittings 13 and 14. The fitting 13 has an inlet passage 15 and two branch passages 16 and 17 leading to the inlet openings 2, 2 of the chambers 1, 1, while the fitting 14 has an outlet passage 18 and two branches 19 and 19a connected to the outlet openings 3, 3 of such chambers.

The fittings 13 and 14 are each provided with rotary-flow control valves 20 and 21. These valves are similar so that a description of one will apply to the other. The valve tapers as indicated in Fig. 2 and is divided by a plate 22 extending from one end of the valve to the other. Each half of the valve is provided with a pair of ports 23 and 24 (Figs. 1 and 5). When the valves are in the position of Fig. 1, the ports permit communication between the passages 15 and 16 and between the passages 18 and 19 so that a flow of liquid passes through the left hand chamber 1, while the right hand chamber 1 is closed off from the liquid. When the valves are rotated through an angle of about 90 degrees, the flow through the left hand chamber is cut off and the right hand chamber brought into the line of flow between the inlet passage 15 and the outlet 18.

The valve is provided with a pair of hollow journals 25 and 26 (Fig. 2) mounted in bearings in the casing heads 27 and 28 and is rotated by a lever 29 keyed to the journal 26. In order to prevent leakage, the grease grooves 30 and 31 are employed, to which grease from a source of supply (not shown) is supplied under pressure. Provision is made for moving the tapering valve endwise preliminary to rotating it, the means employed including the shaft 32 having a hand wheel 33 at its outer end. The shaft is threaded through the journal 25 and swivelled at its inner end in the ball thrust bearing 34. A cap 35 closes the cavity carrying the end of the shaft and the thrust bearing. The valve is easily turned by the lever 29 after it has been moved to the right by the shaft 32, and after the valve has been rotated, it is tightened in its seat by turning the hand wheel 33 in the reverse direction.

In order to flush the chambers without removing the covers 7, 7, the pipes 36, 36 and 37, 37 (Fig. 1) are provided. The pipes 36, 36 may be connected by pipes to a separate source of water supply or to the outlet line leading from the outlet 18. The pipes 37, 37 conduct the flushing water and detritus away. The flushing pipes are provided with cut off valves for closing the pipes when the flushing operation is completed.

The construction provides for a very free flow through the apparatus since the change in the direction of flow is slight and the cross section of the flow passages is relatively uniform. The baskets or strainers have greater strength than the cylindrical and conical strainers heretofore used, and are more compact in proportion to their area. Parts which would be subject to injury by contact with the liquid handled are shielded from such contact, and the construction permits the ready removal and replacement of any part of the apparatus when occasion arises. Other advantages incident to the construction have already been indicated or will be apparent to those skilled in the art. It will be understood that the apparatus shown is merely one embodiment of the invention, and that such apparatus is capable of various modifications. The valves particularly may be of widely varying construction in matter of detail without involving a departure from the invention.

What I claim is:

In combination in a duplex strainer, a pair of strainer chambers side by side, each having an inlet opening at one side and an outlet opening at its opposite side, said chambers being open at one end, a strainer basket in each chamber removable therefrom through the open end of the chamber, a cover for closing the open end of each chamber lying in a vertical plane, means for securing the covers in position closing the chambers, a hinge bar extending between the covers and pivotally connected at each end to one of said covers at the center thereof, and connections to said inlet and outlet openings whereby a flow of liquid may be directed through either one of said chambers while closing off the liquid from the other chamber.

KNUTE BACKLUND.